Feb. 23, 1943.　　　T. A. BOWERS　　　2,311,731
OFFSET PISTON RING
Filed Aug. 30, 1940　　　2 Sheets-Sheet 1
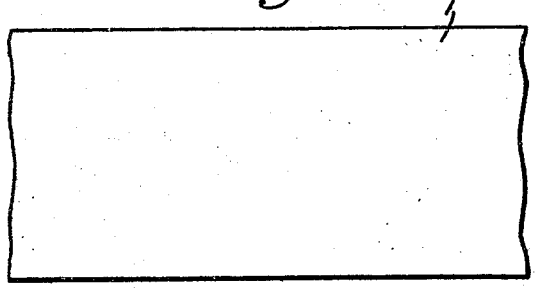
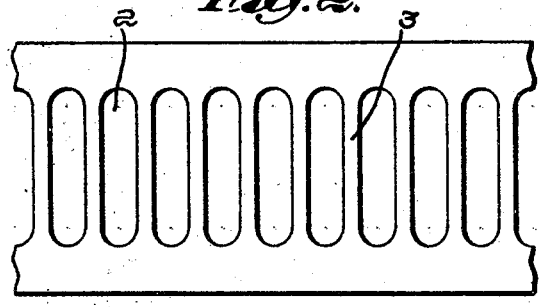
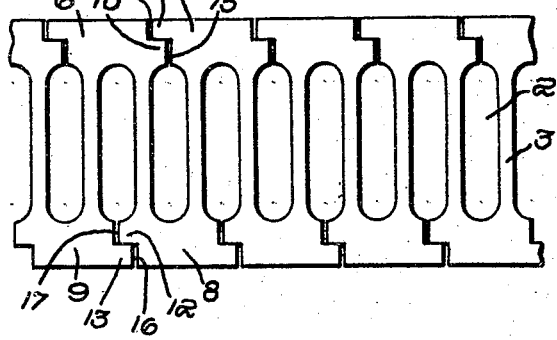
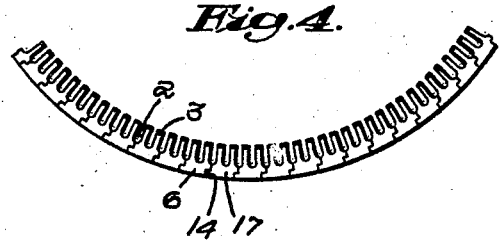
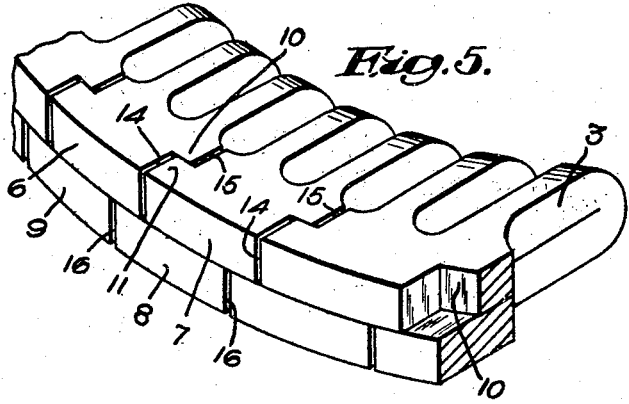
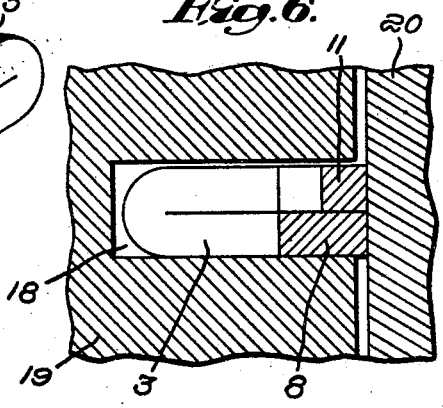

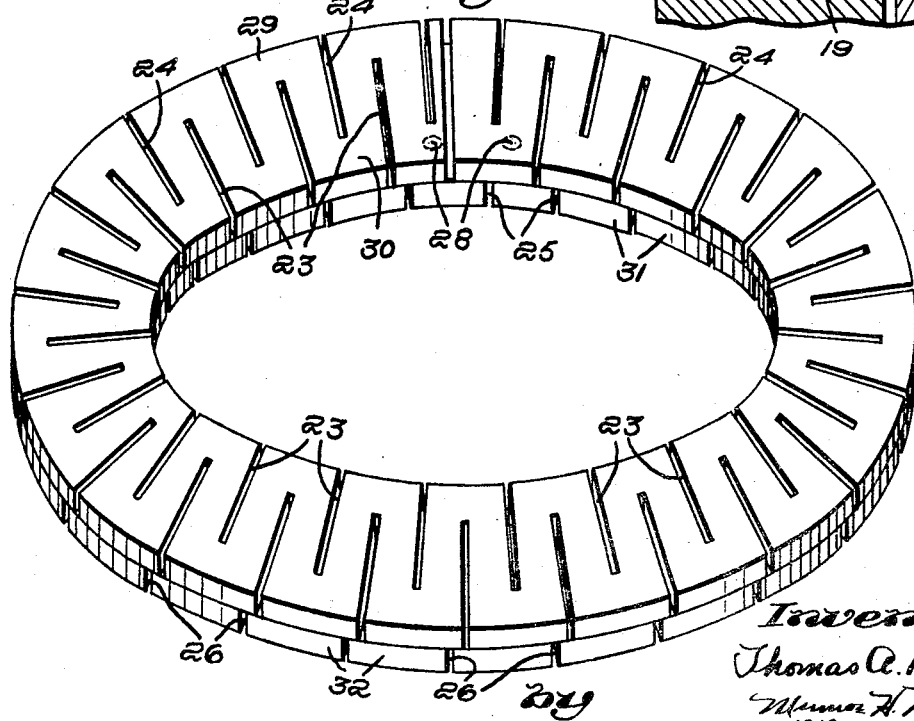

Patented Feb. 23, 1943

2,311,731

UNITED STATES PATENT OFFICE 2,311,731

OFFSET PISTON RING

Thomas A. Bowers, Mattapoisett, Mass., assignor to Power Research Corporation, Boston, Mass., a corporation of Massachusetts Application August 30, 1940, Serial No. 354,839

3 Claims. (Cl. 309—44)

This invention relates to packing rings and is a continuation in part of an earlier patent, No. 2,291,945, issued August 4, 1942.

A principal object of the invention is to improve piston rings and to devise of sheet materials piston ring constructions of the same general character and flexibility described in the co-pending application referred to. The invention also aims to provide means for sealing openings in such ring constructions, in one or more dimensions, whereby they may be utilized as compression rings. Still other objects are to provide piston ring constructions which are adapted to manufacture by tool machines, which can be very quickly manufactured and which are generally simple, cheaper and more efficient in operation.

The nature of the invention will be better understood from the following description of the drawings and discussion relating thereto.

In the accompanying drawings:

Fig. 1 is a fragmentary plan view of a strip of sheet material employed in making the piston rings of the invention;

Fig. 2 is a fragmentary plan view illustrating a step in the method of making piston rings referred to;

Fig. 3 is another fragmentary plan view illustrating a further forming step of the method;

Fig. 4 is a fragmentary plan view illustrating still a further step in the formation of the piston ring noted;

Fig. 5 is an enlarged perspective view fragmentarily illustrating a finished ring of the invention;

Fig. 6 is a fragmentary cross sectional view of a piston and cylinder illustrating the ring of the invention partly in cross section associated therewith;

Fig. 7 is a perspective view fragmentarily illustrating a step of utilizing a plurality of sheets of material in accordance with a modified method of the invention;

Fig. 8 is a detail cross sectional view illustrating a modification of sheet material;

Fig. 9 is another perspective view illustrating a further step in the method of forming a plurality of sheets of material into a piston ring;

Fig. 10 is a perspective view illustrating still another step in the method referred to;

Fig. 11 is a sectional view further illustrating the joining of the sheet materials;

Fig. 12 is a perspective view of a completed ring of the invention; and

Fig. 13 is a cross sectional view of a piston and cylinder illustrating the ring of Fig. 12 mounted therein.

Referring in detail to the drawings, Figs. 1-6 inclusive illustrate one piston ring construction and its method of manufacture. Figs. 7-13 inclusive relate to a modified piston ring and its method of formation.

In the construction indicated in Figs. 1-6 inclusive, numeral 1 indicates a strip of sheet material employed in making the ring of the invention. The sheet is of a resilient character and may be of a spring steel, an alloy, or other metal or material. A development in piston ring construction is the formation, from a strip of such sheet material, of a ring body in which the strip occurs with transversely disposed overlapping cuts or openings, and in which the strip is folded longitudinally of itself, as described in the co-pending application above referred to. These longitudinally folded strip rings are characterized by pronounced circumferential and radial flexibility, constituting a desirable advance in the art of making oil control rings.

According to the present invention, a strip of the sheet material is similarly formed with transversely disposed cuts or openings, and the strip is folded, longitudinally of itself, to provide a ring of the same general character described. However, the partially severed portions of the strip resulting from the transversely disposed cuts or openings are arranged in novel overlapping relation to provide a ring body which is substantially gas tight, in two dimensions, and thereby well adapted to functioning as a compression ring.

As illustrated in Figs. 2 and 3, transversely disposed openings 2 are formed in the strip 1 by some suitable means, as punching. The openings 2 are spaced apart to provide connecting portions or webs 3 extending between opposite sides of strip 1. These openings 2 may be of any suitable width, and instead of being punched out in the manner shown, may consist of cuts or slits of the same relative size and disposition.

The strip is further provided along its edge with offset cuts, alternately connecting with the openings 2, to form separated segments as 6 and 7 along one edge of the strip, and separated segments as 8 and 9 along the other edge of the strip. The segments, by means of the offset cuts, are formed with overlapping portions, such as portions 10, 11, 12 and 13 of the segments 6, 7, 8 and 9 respectively. This results in the formation of outer and inner interstices, as 14 and 15, occurring between the segments 6 and 7, in offset relation to one another, and in the formation of similarly offset outer and inner interstices, as 16 and 17, occurring between segments 8 and 9 at the opposite side of the strip. The strip of sheet material thus treated is longitudinally folded upon itself to form upper and lower layers superimposed one upon the other, as illustrated in Figs. 4 and 5. There results a straight length of material which may then be given a circular or annular set. A length of the folded material in a circular form, suitable for effecting a piston ring of a desired size, may then be cut off from the strip, and various grinding or other conventional finishing operations employed to provide a completed ring, as shown in Figs. 4, 5 and 6.

The operations described in connection with forming and folding the sheet material may be effected by apparatus commonly referred to as "tool machinery," such as punch press mechanism, cutting or shearing dies, folding mechanism, and the like. A straight length of folded and cut material may be formed into a substantially circular body in several ways, one example of which is to force a length of the material through an annular channel or die of suitable diameter.

In the finished ring construction indicated in Figs. 4, 5 and 6, there are provided superimposed layers of sheet material having connecting portions or webs 3 doubled over on themselves, with their points of folding extending radially inward beyond the layers and constituting the inner periphery of the ring. In this folded position of the webs 3, the openings 2 extend radially of the ring and provide for the webs or connecting portions 3 being spaced apart in circumferentially compressible relation to one another. The segments, resulting from cutting the edges of the strip in the manner described, are also sufficiently spaced apart to be circumferentially compressible one to another, and each segment includes at least two of the connecting portions 3 integral therewith.

The interstices as 14 and 15 of one layer, and 16 and 17 of the other layer, extend radially of the ring. However, in the longitudinally folded position of the strip, the interstices as 14 and 15 of the upper layer are arranged in staggered relation with respect to interstices 16 and 17 of the lower layer, which effectually seals all of the interstices of both layers with respect to the passage of gases axially of the ring. This seals the ring in only one dimension. It is necessary also to seal the ring in a second dimension, that is, to the passage of gases radially therethrough.

A feature of the invention is the construction of segments which seal the ring to the passage of gases radially therethrough. This is effected by separating the segments with offset cuts, thereby forming overlapping portions in each segment. These overlapping portions allow adjacent segments to move toward and away from one another, and at the same time to remain in sliding engagement with one another along one edge, at all times, so that an effectual seal is present between the inner interstices as 15 and 17, and the outer interstics 14 and 16 of the respective layers.

When the ring is seated in a piston groove 18 of a piston 19 and engaged against a cylinder wall 20, combustion gases passing by the ring must either be directed axially through those portions between the piston and the cylinder wall, or radially of the ring and then axially to the space referred to. Considering the ring in detail, it will be seen that gases cannot pass axially of the ring since interstices, such as 14 and 15 of one layer, are arranged in staggered relation with respect to interstices, such as 16 and 17, of the other layer. Similarly, gases cannot pass radially of the ring since the overlapping portions of adjacent segments form a seal between inner and outer interstices between these segments, in both the upper and lower layers. As a result, the composite ring body is effective in functioning as a substantially solid member for sealing gases attempting to escape by a piston ring in a piston groove.

The radially and circumferentially flexible character of the ring renders it efficient as a compression member, and especially so in conforming to various types of worn cylinders. This flexible character is derived from both the cutting and the folding of the sheet material. It will be noted that the transversely disposed openings in the strip are arranged in an overlapping manner whereby sections or portions included between the points where the openings overlap may be resiliently bent or flexed toward one another, in the plane of the strip. Resilience is further increased by folding the strip of material longitudinally upon itself, since the folded over connecting portions 3 tend to become slightly twisted when a ring is circumferentially compacted. Being of a resilient material, the connecting portions will tend to resist such twisting action and to spring back to a true radial position, thereby imparting further resilience to the ring body.

The result of developing flexibility by the cutting and folding steps described is to make available a very satisfactory range of compressibility and extensibility, highly adapted to conforming the ring to a cylinder wall. In operation, the ring functions as a gapless ring, with its ends adapted to abut one another. This provides radial flexibility which insures that the ring will engage the wall of a cylinder throughout its circumferential length, and will exert a highly uniform pressure at all points therearound. It should be noted that the extensible character of the ring is attained without its inner periphery being connected to, or supported in any manner by, the back of a piston groove, such as occurs in the use of expander members disposed between the back of a ring and its ring groove. This results in less transfer of piston "slap" and a reduction of wear ordinarily developing from piston slap.

Various advantages are obtained from the ring construction described. There is provided a one-piece piston ring which is easily handled and quickly and simply assembled about a piston. Novel extensible and compressible character is incorporated in an endless ring, particularly adapting the ring to conforming to cylinder walls which are worn "tapered" or "out-or-round." The structure is readily formed of tough durable materials such as steel, of which only relatively small amounts are required to be used. This results in a light and durable piston ring. The use of such materials, together with the procedures indicated for forming them into piston rings, is highly adapted to cheap, fast manufacturing processes, making use of conventional tool machinery of the type referred to, which in turn offers substantial savings in the manufacture of rings.

While the particular forming steps illustrated have been shown in connection with a length or strip of sheet material, it is intended that such operations may be effected upon materials occurring in varying forms, as in sheet form or in a web or roll. Varying thicknesses of material may also be utilized, as by having one part of the strip thicker than another part, or by using a plurality of strips or sheets. The cutting or forming operations may be modified, as for instance the openings 2 may be substituted by alternately disposed slits or cuts. Still other changes in the arrangement of the openings or cuts may be resorted to, as for example openings may be disposed diagonally or angularly of a strip of the material, or in other non-uniform ways. Also, the cutting or forming operations may be carried out at other stages in the method of making the ring, as for instance after a sheet or strip of piston ring material has been folded longitudinally of itself, or at some other point.

The longitudinally folded strip piston ring construction may be used to form a ring of the conventional C type, either with or without openings or cuts being provided in the material, and the layers of material resulting from longitudinally folding the strip may be arranged to occur at the inner and outer peripheries of the ring, as effected by disposing a length of the folded material in a position at right angles to the position assumed in Figs. 4, 5, and 6.

In Figs. 7–13 inclusive, a modified type of piston ring and method of manufacture has been illustrated. A plurality of strips of sheet material 21 and 22 are formed with openings or interstices transversely extending inwardly from opposite edges of each strip as 23 and 24 of one strip, and 25 and 26 of the other. If desired, the strips may be punched or formed in any of the various ways above described, and a curved formation may also be given to the strips at the time they are punched or cut, as illustrated in Fig. 9. One desirable means of quickly obtaining a strip having a circular formation consists in the use of a strip which is thicker along one edge than an opposite edge, as illustrated by the strip 27 in Fig. 8. The openings 23 of one strip result in the formation of inner segments 30, while the openings 24 form outer segments 29. Similarly, the openings 25 and 26 form segments 31 and 32 respectively.

In accordance with the invention the formed strips are secured one above another in the manner illustrated in Fig. 10, with interstices 23 and 24 of one strip occurring in staggered relation with respect to the interstices 25 and 26 of the other strip. Any suitable means of securing the strips may be resorted to, as the spot welding 28 indicated in Fig. 10, or other mechanical fastening means. The spot welding 28 is preferably effected at inner and outer edges of the two strips, as illustrated in Fig. 10, and the interstices of one layer are arranged in offset relation with respect to the interstices of the other layer.

Upon securing the two strips together in the manner described, it will be noted that adjacent portions through the two strips, as for example inner segment 30 of the upper strip and inner segment 32 of the lower strip, are maintained in fixed relation with respect to one another. Similarly, outer segment 29 and outer segment 31 are held in fixed relation. As a result, when the ring is flexed circumferentially each of the pairs of fixed segments move toward and away from adjacent pairs of fixed segments as a single body. At all times, one pair of fixed segments have an overlapping portion which is slidably engaged with a corresponding overlapping portion of an adjacent fixed pair of segments. This provides a constant seal to the passage of gases axially of the ring.

At the same time, all of the interstices terminate at points within one side or the other of each of the strips, and therefore are sealed to the passage of gases radially through the interstices. As a result, an efficient sealing ring is obtained, having the radial and circumferential compressibility noted in connection with the ring illustrated in Figs. 1–6, and similarly sealed to the passage of gases in two dimensions.

When a ring constructed of upper and lower strips of material joined together is subjected to the action of combustion gas pressure, as in a piston groove 18 (Fig. 13), there may result a tendency for the upper overlapping portion, of a fixed pair of segments, to become pinched or tightly forced against a corresponding portion of an adjacent fixed pair of segments, to such an extent that the overlapping portions cannot slide one upon the other. If this occurs, the ring loses its ability to flex and will thereupon fail to properly adhere to the periphery of a cylinder and will allow gas to leak thereby. Such a condition is substantially obviated by locating the strips one upon another in such manner that the interstices of one strip are offset, with respect to the interstices of the other strip, an amount less than half of the width of the segments formed in the strips. For very high pressure conditions such as in a Diesel engine, the possibility of pinching of the ring sections may be even further minimized by offsetting the interstices of a lower strip in relation to the interstices of an upper layer, an amount less than half the space between the said interstices of the upper strip. It should be noted that this relation of the interstices of the two strips may be effected while continuing to maintain the strips substantially sealed to the passage of gas axially of the ring through the interstices.

The ring illustrated in Fig. 12 is characterized by advantages already recited in connection with the ring shown in Figs. 1–6 inclusive. In addition, it presents increased seating surfaces for sealing the ring in a piston groove and provides an inner periphery, of relatively reduced surface area, against which combustion gas pressure may be exerted to urge the ring against a cylinder wall and cause wear. The open nature of the ring structure serves to facilitate conveyance of limited amounts of oil in combination with the function of sealing gases. The ring may therefore be considered to have utility as both a compression ring and an oil control ring, and this characteristic is also present with respect to rings indicated in Figs. 1–6 inclusive. Pronounced lightness, cheapness and efficiency are also present in the ring.

The various changes and modifications noted in respect to the ring modification in Figs. 1–6 inclusive may also be resorted to in the modification shown in Fig. 12, and in addition, the ring is highly adapted to being utilized in a position at right angles to that illustrated in the drawings, as for example where the interstices extend axially of the ring instead of radially as illustrated.

While I have shown preferred embodiments of my invention, it should be understood that further changes and modifications may be resorted to in keeping with the spirit of the invention.

Having described my invention, I claim:

1. A circumferentially and radially flexible piston ring comprising upper and lower layers of sheet material secured one upon another by connecting web portions, each of said layers having inner interstices extending from the inner peripheries thereof to a point within the ring, each of said layers having outer interstices radially extending from the outer peripheries thereof inwardly of the ring, said outer interstices being arranged in staggered relation with respect to the said inner interstices, the inner interstices of said lower layer of sheet material being circumferentially offset in a direction circumferentially of the ring with respect to the outer interstices a distance less than half the space between the said interstices of the upper layer of sheet material.

2. A circumferentially and radially flexible piston ring comprising upper and lower layers of sheet material secured one upon another by connecting web portions, each of said layers having interstices extending from the inner peripheries thereof to a point within the ring, each of said layers further having interstices extending radially from the outer peripheries thereof to a point within the ring, said layers being separated into segments by the interstices, said interstices being connected by cuts extending in a direction circumferentially of the ring a distance less than half the circumferential width of one of the said segments.

3. A circumferentially and radially flexible piston ring comprising upper and lower layers of sheet material secured one upon another by connecting web portions, each of said layers being divided into segments by offset interstices extending between inner and outer peripheries of the ring, offset interstices of one of the layers being arranged in staggered relation with respect to offset interstices of the other of the layers to provide overlapping segment portions, said overlapping segment portions being of a circumferential width less than one-half of the circumferential width of the said segments.

THOMAS A. BOWERS.